US009288680B2

(12) United States Patent
Vasudevan et al.

(10) Patent No.: US 9,288,680 B2
(45) Date of Patent: Mar. 15, 2016

(54) ALMOST BLANK SUBFRAME DUTY CYCLE ADAPTATION IN HETEROGENEOUS NETWORKS

(75) Inventors: Subramanian Vasudevan, Morristown, NJ (US); Rahul N. Pupala, Piscataway, NJ (US); Kathiravetpillai Sivanesan, Richardson, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 243 days.

(21) Appl. No.: 13/427,175

(22) Filed: Mar. 22, 2012

(65) Prior Publication Data

US 2013/0250764 A1 Sep. 26, 2013

(51) Int. Cl.
| | |
|---|---|
| H04L 12/26 | (2006.01) |
| H04W 16/14 | (2009.01) |
| H04L 12/863 | (2013.01) |
| H04W 36/30 | (2009.01) |
| H04L 12/70 | (2013.01) |
| H04W 16/32 | (2009.01) |

(52) U.S. Cl.
CPC ........... *H04W 16/14* (2013.01); *H04L 47/6225* (2013.01); *H04L 2012/568* (2013.01); *H04L 2012/5678* (2013.01); *H04W 16/32* (2013.01); *H04W 36/30* (2013.01)

(58) Field of Classification Search
CPC ..................... H04L 47/6225; H04L 2012/568; H04L 2012/5678; H04W 36/30
USPC .............. 370/236, 252, 332, 329, 230.1, 462, 370/546; 455/436, 418
See application file for complete search history.

(56) References Cited

U.S. PATENT DOCUMENTS

| | | | | |
|---|---|---|---|---|
| 6,459,894 | B1 * | 10/2002 | Phillips ................. | H04W 48/18 455/424 |
| 7,317,917 | B2 * | 1/2008 | Qian et al. ................. | 455/432.1 |
| 8,494,467 | B2 * | 7/2013 | Henttonen et al. ........... | 455/136 |
| 8,868,089 | B2 * | 10/2014 | Lindbom et al. .............. | 455/450 |
| 2001/0011019 | A1 * | 8/2001 | Jokimies ....................... | 455/450 |
| 2002/0193112 | A1 * | 12/2002 | Aoki et al. .................... | 455/437 |

(Continued)

FOREIGN PATENT DOCUMENTS

| | | |
|---|---|---|
| JP | 2008-517504 A | 5/2008 |
| WO | WO 2013/012896 | 1/2013 |

OTHER PUBLICATIONS

Search Report and Written Opinion from corresponding international patent application No. PCT/US2013/033067 dated Jun. 3, 2013.

(Continued)

*Primary Examiner* — Ricky Ngo
*Assistant Examiner* — Dewanda Samuel
(74) *Attorney, Agent, or Firm* — Harness, Dickey & Pierce, P.L.C.

(57) ABSTRACT

A method of setting an almost blank subframe (ABS) duty cycle in a heterogeneous network including a macro cell and one or more small cells, the one or more small cells being underlaid with respect to the macro cell includes obtaining, at a network element, loading information corresponding to each of the macro cell and the one or more small cells, the loading information including, for each of the macro cell and the one or more small cells, an indication of an amount of information buffered at the cell for each user attached to the cell; and determining the ABS duty cycle based on the obtained loading information.

8 Claims, 4 Drawing Sheets

(56) References Cited

U.S. PATENT DOCUMENTS

| | | | |
|---|---|---|---|
| 2006/0084389 | A1 | 4/2006 | Beale et al. |
| 2012/0087266 | A1* | 4/2012 | Vajapeyam et al. ........... 370/252 |
| 2012/0106476 | A1* | 5/2012 | Song et al. ................... 370/329 |
| 2012/0113843 | A1* | 5/2012 | Watfa et al. ................... 370/252 |
| 2012/0122472 | A1* | 5/2012 | Krishnamurthy et al. . 455/456.1 |
| 2012/0207025 | A1* | 8/2012 | Barbieri et al. ............... 370/236 |
| 2013/0044704 | A1* | 2/2013 | Pang ................. H04W 72/0426 370/329 |
| 2013/0084865 | A1* | 4/2013 | Agrawal et al. ............... 455/436 |

OTHER PUBLICATIONS

Alcatel-Lucent: "Signalling support for Almost Blank Subframe patterns," 3GPP Draft; R2-106449, $3^{rd}$ Generation Partnership Project (3GPP), Mobile Competence Centre; 650, Route Des Lucioles; F-06921 Sophia-Antipolis Cedex; France, vol. RAN WG2, no. Jacksonville, USA; Nov. 15, 2010, Nov. 9, 2010, XP050467151, [retrieved on Nov. 9, 2010], p. 1, line 1—p. 4, line 5.

Alcatel-Lucent: "Introduction of X2 Signalling for Almost Blank Subframe Pattern," 3GPP Draft; R3-103334, $3^{rd}$ Generation Partnership Project (3GPP), Mobile Competence Centre; 650, Route Des Lucioles; F-06921 Sophia-Antipolis Cedex; France, vol. RAN WG3, no. Jacksonville, USA; Nov. 15, 2010, Nov. 9, 2010, XP050496690, [retrieved on Nov. 9, 2010], paragraphs 8.3.1.1 to 9.1.2.1.

"Load Balancing between Femto and Macro ABS; C80216m-09_2542," IEEE Draft; C80216M-09_2452, IEEE-SA, Piscataway, NJ USA, vol. 802.16m, Nov. 6, 2009, pp. 1-4, XP017613153, [retrieved on Nov. 9, 2009], p. 2-p. 4.

3PP TS 36.423 v10.4.0 (Dec. 2011), "$3^{rd}$ Generation Partnership Project; Technical Specification Group Radio Access Network; Evolved Universal Terrestrial Radio Access Network (E-UTRAN); X2 application protocol (X2AP) (Release 10)," Section 9.2.58, p. 72, Dec. 2011.

International Preliminary Report on Patentability for International Application No. PCT/US2013/033067 dated Sep. 23, 2014.

Qualcomm Incorporated, Overview of eICIC backhaul procedure, 3GPP TSG-RAN WG3 meeting #70 R3-103414, Nov. 2010.

* cited by examiner

ALMOST BLANK SUBFRAME DUTY CYCLE ADAPTATION IN HETEROGENEOUS NETWORKS

BACKGROUND

1. Field

Example embodiments relate generally to small cells within macro cells and in particular to an apparatus and/or method for determining configuration parameters for this heterogeneous network.

2. Related Art

Heterogeneous wireless networks (HetNets) are deployments of cells with differing coverage radii within a single geographic area. A typical configuration is one where macro (e.g., large) cells provide contiguous coverage over the area while pico or femto (e.g., small) cells cover local hot spots or coverage holes. When both the macro cells and small cells share the same carrier frequency, the deployment is called a co-channel or shared-carrier deployment.

For example, a HetNet may include macro base stations (BSs) and small cell BSs. Macro BSs provide wireless coverage for user equipment (UEs) within the macro cells which may cover large geographical areas, while small cell BSs may provide wireless coverage for UEs located in the small cells which may cover smaller geographical areas within the coverage are of a macro BS. Parameters needed to configure BSs within HetNets include patterns for an almost blank subframe (ABS). A blank subframe contains no transmission from the macro cell. An "almost blank" subframe is a subframe with reduced transmit power (e.g., reduced from a maximum transmit power) and/or a reduced activity subframe (e.g., contains less data than a fully loaded subframe).

SUMMARY

According to at least one example embodiment, a method of setting an almost blank subframe (ABS) duty cycle in a heterogeneous network including a macro cell and one or more small cells, the one or more small cells being underlaid with respect to the macro cell, includes obtaining, at a network element, loading information corresponding to each of the macro cell and the one or more small cells, the loading information including, for each of the macro cell and the one or more small cells, an indication of an amount of information buffered at the cell for each user attached to the cell; and determining the ABS duty cycle based on the obtained loading information.

According to at least one example embodiment, the method further includes sending the determined ABS duty cycle from the network element towards base stations (BS)s of one or more cells from among the macro cell and the one or more small cells.

According to at least one example embodiment, the network element is a BS of a cell from among the macro cell and the one or more small cells.

According to at least one example embodiment, for each of the one or more small cells, users attached to the small cell may be designated as being associated with one of an inner region of the small cell or an outer region of the small cell, and for each of the one or more small cells, the corresponding loading information includes inner loading information and outer loading information. The inner loading information includes an indication of an amount of information buffered for each user designated as being associated with the inner region of the small cell, and the outer loading information includes an indication of an amount of information buffered for each user designated as being associated with the outer region of the small cell.

According to at least one example embodiment, the determined ABS duty cycle is defined by the following expressions $$\theta^{opt} = \frac{\alpha}{1+\alpha}; \alpha = \sqrt{\frac{A^{cre}}{A^{inc} + A^M}},$$

where $\theta^{opt}$ is the determined ABS duty cycle, the value $A^M$ is a representation of the obtained loading information corresponding to the macro cell, the value $A^{inc}$ is a representation of the obtained loading information corresponding to the inner regions of the one or more small cells, and the value $A^{cre}$ is a representation of the loading information corresponding to the outer regions of the one or more small cells.

According to at least one example embodiment, a network apparatus for setting an almost blank subframe (ABS) duty cycle in a heterogeneous network including a macro cell and one or more small cells, the one or more small cells being underlaid with respect to the macro cell, may include a receiver unit configured to receive data; a transmitting unit configured to transmit data; a memory unit; and a processing unit coupled to the transmitting unit, the receiving unit, and the memory unit. The processing unit is configured to control operations associated with determining the ABS duty cycle, the operations including obtaining, at a network element, loading information corresponding to each of the macro cell and the one or more small cells, the loading information including, for each of the macro cell and the one or more small cells, an indication of an amount of information buffered at the cell for each user attached to the cell; and determining the ABS duty cycle based on the obtained loading information.

According to at least one example embodiment, the apparatus is further configured to send the determined ABS duty cycle from the network element towards one or more base stations (BS)s of cells from among the macro cell and the one or more small cells.

According to at least one example embodiment, the network element is a BS of a cell from among the macro cell and the one or more small cells.

According to at least one example embodiment, for each of the one or more small cells, users attached to the small cell are designated as being associated with one of an inner region of the small cell or an outer region of the small cell, and for each of the one or more small cells, the corresponding loading information includes inner loading information and outer loading information. The inner loading information includes an indication of an amount of information buffered for each user designated as being associated with the inner region of the small cell, and the outer loading information includes an indication of an amount of information buffered for each user designated as being associated with the outer region of the small cell.

According to at least one example embodiment, the processor is configured such that the determined ABS duty cycle is defined by the following expressions $$\theta^{opt} = \frac{\alpha}{1+\alpha}; \alpha = \sqrt{\frac{A^{cre}}{A^{inc} + A^M}},$$

where $\theta^{opt}$ is the determined ABS duty cycle, the value $A^M$ is a representation of the obtained loading information corresponding to the macro cell, the value $A^{inc}$ is a representation of the obtained loading information corresponding to the inner regions of the one or more small cells, and the value $A^{cre}$ is a representation of the loading information corresponding to the outer regions of the one or more small cells.

BRIEF DESCRIPTION OF THE DRAWINGS

At least one example embodiment will become more fully understood from the detailed description provided below and the accompanying drawings, wherein like elements are represented by like reference numerals, which are given by way of illustration only and thus are not limiting of example embodiments and wherein.

DETAILED DESCRIPTION OF EXAMPLE EMBODIMENTS

Figure 1A:
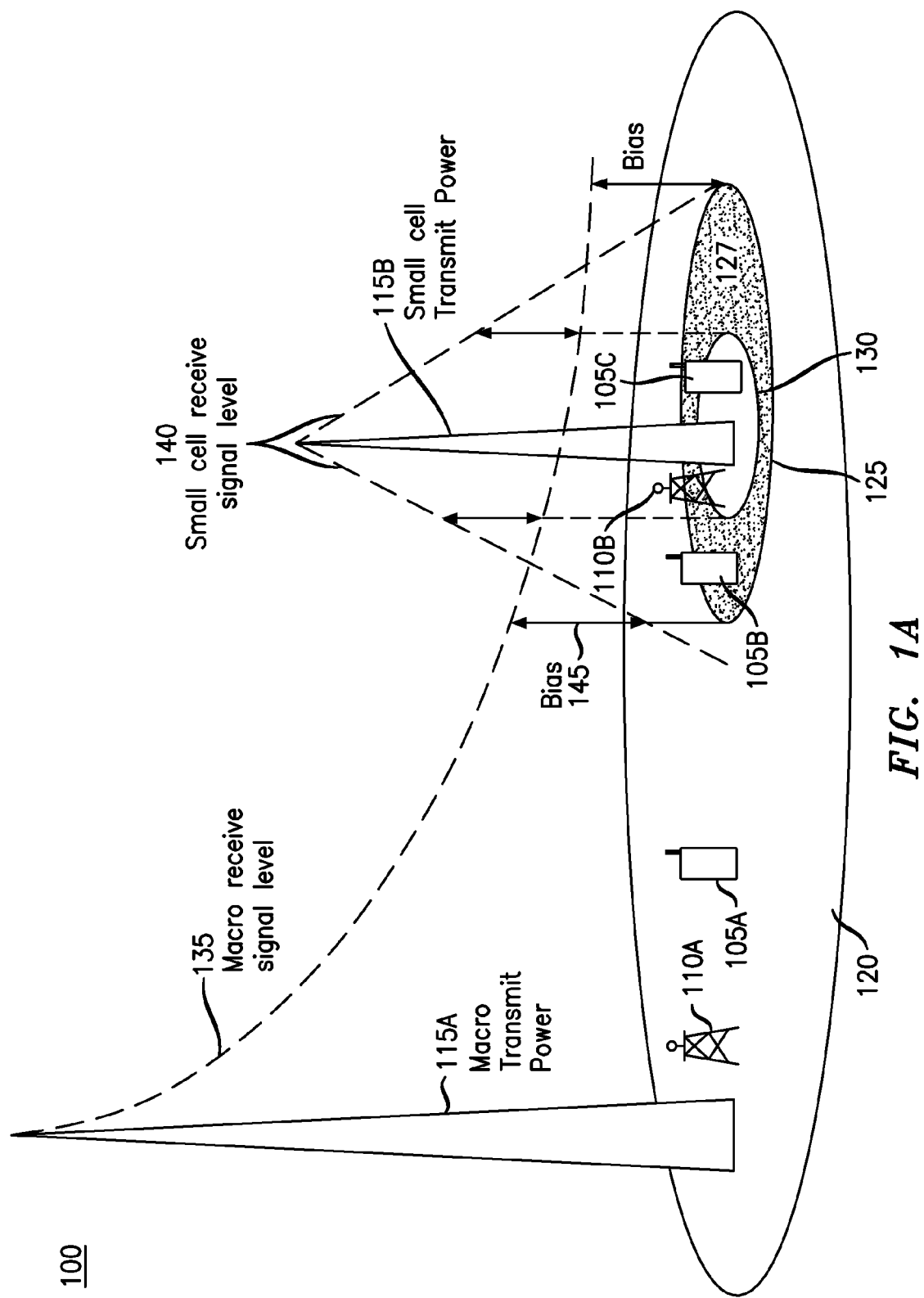
FIG. 1A is a diagram illustrating a portion of a wireless communications network according to at least one example embodiment.

Various at least one example embodiment will now be described more fully with reference to the accompanying drawings in which some example embodiments are shown.

Detailed illustrative embodiments are disclosed herein. However, specific structural and functional details disclosed herein are merely representative for purposes of describing at least one example embodiment. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of example embodiments. Like numbers refer to like elements throughout the description of the figures. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term user equipment (UE) may be considered synonymous to, and may hereafter be occasionally referred to, as a terminal, mobile unit, mobile station, mobile user, access terminal (AT), subscriber, user, remote station, access terminal, receiver, etc., and may describe a remote user of wireless resources in a wireless communication network. The term base station (BS) may be considered synonymous to and/or referred to as a base transceiver station (BTS), NodeB, extended Node B (eNB), access point (AP), etc. and may describe equipment that provides the radio baseband functions for data and/or voice connectivity between a network and one or more users.

Exemplary embodiments are discussed herein as being implemented in a suitable computing environment. Although not required, exemplary embodiments will be described in the general context of computer-executable instructions, such as program modules or functional processes, being executed by one or more computer processors or CPUs. Generally, program modules or functional processes include routines, programs, objects, components, data structures, etc. that performs particular tasks or implement particular abstract data types.

The program modules and functional processes discussed herein may be implemented using existing hardware in existing communication networks. For example, program modules and functional processes discussed herein may be implemented using existing hardware at existing network elements or control nodes (e.g., an AP shown in FIG. 1). Such existing hardware may include one or more digital signal processors (DSPs), application-specific-integrated-circuits (ASICs), field programmable gate arrays (FPGAs) computers or the like.

In the following description, illustrative embodiments will be described with reference to acts and symbolic representations of operations (e.g., in the form of flowcharts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, which reconfigures or otherwise alters the operation of the computer in a manner well understood by those skilled in the art.

Overview of Network Architecture

FIG. 1A illustrates a portion of a wireless communications network 100. Referring to FIG. 1A, wireless communications network 100 may follow, for example, an LTE protocol. Communications network 100 includes a macro base station (BS) 110A; a small cell BS 110B; a macro cell 120, a small cell 125; and first through third UEs 105A-C. The small cell 125 may be, for example a pico cell or a femto cell. Further, the term small cell as used herein may be considered synonymous to and/or referred to as pico cell or femto cell. The small cell 125 includes a cell range extended area (CRE) 127 and an in-cell area 130.

In the example illustrated in FIG. 1A, the first UE 105A is attached to the macro cell 120, and the second and third UEs 105B and 105C are attached to the small cell 125. Further, the second UE 105B is designated as a CRE UE and the third UE 105C is designated as an in-cell UE. As will be discussed in greater detail below, the attachment of UEs to either the macro cell 120 or the small cell 125 may be controlled by a bias value 145.

Though, for the purpose of simplicity, communications network 100 is illustrated as having only macro BS 110A, small cell BSs 110B, and first through third UEs 105A-C, communications network 100 may have any number of macro BSs, small cell BSs and UEs. Further, the macro BS 110A and small cell BS 110B may be connected to other core network elements included in the communications network 100 including, for example, one or more mobility management entities (MME) and/or one or more operations, administration and management (OAM) nodes (not shown). Further, the MME may include the OAM node.

The macro BS 110A may be, for example, an evolved node B (eNB) providing wireless coverage for UEs within the macro cell 120. The small cell BS 110B may be, for example, an eNB underlaid with respect to the macro BS 110A meaning small cell BS 110B may provide wireless coverage for UEs associated with the small cell 125 that supplements coverage provided by the macro BS 110A for UEs in the macro cell 120. Data, control signals and other information described herein as being sent and/or received by the macro cell 120 may be sent and/or received by the macro BS 110A. Further, operations described herein as being performed by the macro cell 120 may be performed by the macro BS 110A. Data, control signals and other information described herein as being sent and/or received by the small cell 120 may be sent and/or received by the small cell BS 110B. Further, operations described herein as being performed by the small cell 125 may be performed by the small cell BS 110B.

In general, a transmit power of the macro BS 110A may be greater than a transmit power of the small cell BS 110B. Transmit powers 115A and 115B illustrate an example of the relative transmit powers of the macro BS 110A and the small cell BS 110B, respectively. For example the transmit powers 115A and 115B be may be 40 W and 1 W, respectively. Macro receive signal level 135 illustrates an example of a strength of a receive signal of the macro cell 120 measured by UEs within communications network 100 as a function of the BS-UE distance. As is illustrated in FIG. 1A, in general, the strength of the macro receive signal level may drop as a distance from the UE to a location of the macro BS 110A increases. Small cell receive signal level 140 illustrates an example of a strength of a receive signal of the small cell 125 measured by UEs within communications network 100 as a function of the BS-UE distance. As is illustrated in FIG. 1A, in general, the strength of the small cell receive signal level 140 may drop as a distance from the UE to a location of the small cell BS 110B increases. Though, for the purpose of simplicity, macro and small cell signal levels 135 and 140 are described above and illustrated in FIG. 1A as having strengths which decrease along with an increased distance from a BS, macro and small cell signal strengths can be effected by any of a number of other factors in addition to distance including, for example, shapes and heights of buildings or physical structures within the coverage areas of macro cell 120 and small cell 125, and a number of UEs or an amount of UE traffic within a given region of the coverage area of the macro cell 120 or the small cell 125.

Explanation of the Bias Value and Almost Blank Subframe (ABS) Parameters

UEs in the communications network 100 that are within both a coverage area of the macro cell 120 and coverage areas of the small cell 125 may be in communication with the communications network 100 via a wireless connection to either the macro BS 110A or one of the small cell BS 110B. A UE in communications network 100 makes a decision with respect to which of the macro cell 120 and the small cell 125 to be associated with by comparing the macro receive signal level 135 as measured by the UE to the small cell receive signal level as measured by the UE with use of a bias value. For example, for a UE i currently attached to the macro cell 120, if MR(i)<PR(i)+B, where MR(i) is the macro signal strength 135 measured at the UE i, and PR(i) is the small cell signal strength 140 measured at the UE i, and B is the bias 145, then UE i is handed over from the macro cell 120 to the small cell 125. The handover of the UE i may be performed according to known processes.

Accordingly, once a UE associated with the macro cell 120 determines that the macro receive signal level 135 is below the small cell receive signal level 140 plus a bias value 145, the UE may initiate a hand-over operation from the macro cell 120 to the small cell 125 using known methods. As is illustrated in FIG. 1A, the points at which the macro receive signal level 135 is below the small cell receive signal level 140 plus the bias value 145 define the boundaries of the small cell 125. Accordingly, the bias value 145 may control an amount of UEs which are handed over from the macro cell 120 to the small cell 125 by controlling, for example, a tendency of the UEs to initiate a hand off operation.

When the macro cell 120 and the small cell 125 transmit data over downlink connections to associated UEs, the transmissions of the macro cell 120 may cause interference for UEs receiving data from the small cell 125 (e.g., those like the second UE 105B). Further, the transmissions of the small cell 125 may cause interference for UEs receiving data from the macro cell 120 (e.g., those like the first UE 105A). Accordingly, wireless communications network 100 implements an interference reduction scheme which includes dividing UEs attached to the small cell 125 into in-cell UEs and CRE UEs using the reference signal received power (RSRP) according to known methods. For example, for a UE i currently attached to the small cell 125, if PR(i)>MR(i), where MR(i) is the macro signal strength 135 measured at the UE i, and PR(i) is the small cell signal strength 140 measured at the UE i, then UE i may be designated as an in-cell UE. Otherwise, if MR(i)-Bias<PR(i)<MR(i), the UE i may be designated as a CRE UE.

The wireless communication network 100 may implement the enhanced inter cell interference coordination (eICIC) scheme defined by, for example, the 3GPP Release 10 standards. For example, in order to reduce an amount of interference experienced by UEs receiving downlink transmissions, transmissions for UEs designated as CRE UEs (e.g, those like the second UE 105B in the CRE region 127) may be scheduled at a different time from transmissions for UEs designated as in-cell UEs (e.g., those like the third UE 105C within the in-cell area 130) and UEs attached to the macro cell 120 (e.g., those like the first UE 105A within the macro cell 120 and outside the small cell 125). This feature will now be discussed in greater detail below with reference to FIG. 1B.

Figure 1B:
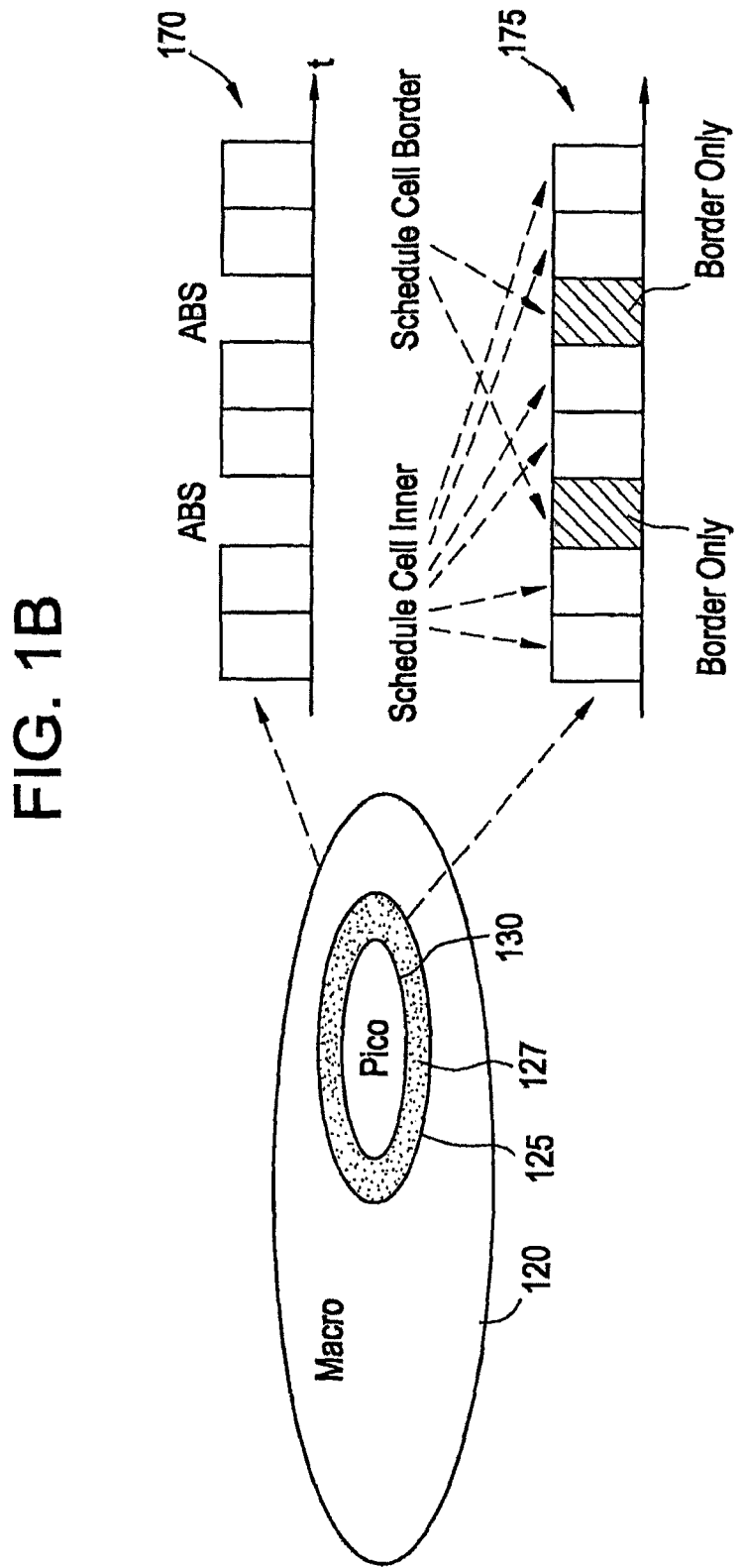
FIG. 1B is a diagram illustrating an example relationship between transmission schedules for macro and small cells.

FIG. 1B is a diagram illustrating an example relationship between transmission schedules for macro and small cells 120 and 125. Referring to FIG. 1B, first graph 170 illustrates subframes transmitted over time for the macro cell 120, and second graph 175 illustrates subframes transmitted over time for the small cell 125. As is illustrated by the first graph 170, the macro cell 120 may transmit downlink data on all frames except those designated as almost blank subframes (ABSs). As is illustrated by the second graph 175, the small cell 125 may transmit data to UEs designated as in-cell UEs on all frames except those designated as ABS frames. Accordingly, the small cell 125 may transmit data to UEs designated as in-cell UEs following the same schedule as the macro cell 120. Further, as is illustrated by the second graph 175, the small cell 125 may transmit data to UEs designated as small cell border UEs on the subframes designated by the macro cell 120 as ABS subframes. In the example illustrated in FIG. 1B, an ABS pattern of the transmission schedules illustrated in first and second graphs 170 and 175 is configured such that every third subframe is designated as an ABS subframe. Accordingly, in the ABS pattern illustrated in FIG. 1B, there is a 2-to-1 ratio between non-ABS subframes and ABS subframes.

According to at least one example embodiment, in the wireless network 100, the ABS pattern may be determined by a BS within the wireless network 100 and communicated, by that BS, to other BSs within the wireless network 100. For example, the macro BS 110A may set an ABS pattern for downlink transmission in the macro cell 120 based on information stored in the macro BS 110A and information received from the small cell BS 110B. The macro BS 110A may then communicate the set ABS pattern to the small cell BS 110B so the small cell BS 110B can schedule downlink transmission in the small cell 125 based on the set ABS pattern. Alternatively, the small cell BS 110B may set an ABS pattern for downlink transmission in the small cell 125 based on information stored in the small cell BS 110B and information received from the macro cell BS 110A. The small cell BS 110B may then communicate the set ABS pattern to the macro BS 110A so the macro BS 110A can schedule downlink transmission in the macro cell 120 based on the set ABS pattern. Methods by which one or more BSs within the wireless network 100 can determine an ABS pattern will be discussed in greater detail below with reference to FIG. 2.

Though, in the example illustrated in FIG. 1A, the ABS pattern includes a 2-to-1 ratio between non-ABS subframes and ABS subframes, this is only an example, and the ABS pattern can include any ratio between non-ABS subframes and ABS subframes including, for example, 4-to-3, 3-to-2, 3-to-1, 4-to-1, etc. Accordingly, a corresponding ABS duty cycle, defined as (number of ABS sub-frames)*100/(number of ABS sub-frames+number of non-ABS sub-frames) can have any value.

In initial HetNet deployment, there is either no adaptation, or very slow (in the order of hours or days) adaption of cell association bias and ABS duty cycle. Radio Frequency coverage maps and spatio-temporal traffic density profiles collected a-priori from the field may be used to set the cell bias and the ABS duty cycle in a semi-static manner to meet the capacity and fairness (reduction in disparities in user experience) targets.

Methods of setting an ABS duty cycle will now be discussed in greater detail below.

Setting ABS Duty Cycle

In the context then, of ABS adaptation, first adaptation algorithms that make certain simplifying assumptions regarding traffic characteristics will now be described.

Specifically, traffic is assumed not be bursty, i.e., always present for users in the network. This assumption is called the full buffer assumption, and refers to the fact that the base station buffers containing data to be transmitted to the users are always full. As used hereafter, the term user may be considered synonymous to the term active user, where an active user is a user having a non-empty data buffer at the BS to which the user is attached.

Furthermore it is assumed that (1) there are no latency constraints associated with the different traffic streams, and that (2) the base station schedulers make only a 'best effort' delivery of data to the users in the system, subject to maintaining some fairness in delivered throughput to each of the users.

Two utility metrics that can be developed in the context of the above assumptions are the sum-rate utility and product-rate utility metrics, that attempt to maximize capacity (throughput) and fairness (balanced user throughputs) respectively. In both cases (and in the new formulations presented later), the assumption is that only CRE users (and no others) are scheduled at small cell during the occurrence of ABS subframes at macro cells.

For a network with a macro cell M with j embedded small cells, we can represent the sum-rate utility as $$U = (1-\theta)\Sigma_{i \in M} R_i^M + \theta \Sigma_j \Sigma_{i \in cre} R_{ij}^{cre} + (1-\theta)\Sigma_j \Sigma_{i \in inc} R_{ij}^{inc}, \quad (1)$$

where $\theta$ is the ABS Duty Cycle; and $R_i^M$, $R_{ij}^{cre}$, and $R_{ij}^{inc}$ are the average data rates of the $i^{th}$ user attached the macro, the average data rates of the $i^{th}$ CRE user of the $j^{th}$ small cell, and the average data rates of the $i^{th}$ in-cell (inc) region user of the $j^{th}$ small cell respectively.

The product rate utility can be represented as $$U = \Pi_{i \in M}(1-\theta)R_i^M \Pi_j \Pi_{i \in inc}(1-\theta)R_{ij}^{inc} \Pi_j \Pi_{i \in cre} \theta R_{ij}^{cre}. \quad (2)$$

Based on equation (2) above, the sum utility is linear in $\theta$, and it will be maximized at one of the extremities of the ABS duty cycle range, e.g., the minimum or maximum allowed value for $\theta$.

The product utility has been shown to be maximized at $$\theta = \frac{\sum_j k_j^{cre}}{k^M + \sum_j k_j^{inc} + \sum_j k_j^{cre}}, \quad (3)$$

where $k_j^{cre}$ and $k_j^{inc}$ are the number of users attached to the $j^{th}$ small cell in the CRE region and the in-cell area respectively, and $k^M$ is the number of users attached the macro cell.

In other words, based on equations (1)-(3) above, the optimal ABS duty cycle tracks the fractional user population in the CRE region (alternatively termed the fractional CRE population). As users move in and out of the CRE region, the in-cell area, and the macro cell, it is desirable to adapt the ABS duty cycle accordingly to (i) increase or maximize fairness, i.e. ensure that imbalances in individual user throughputs are reduced or minimized (via the Product Utility), or (ii) increase or maximize throughputs (via the Sum Utility).

A problem with setting an ABS duty ration in accordance with the method described above with respect to equations (1)-(3), and the optimal operating point the above-described method yields is that when there is a non-full buffer or bursty/intermittent traffic model associated with the users, the movement of the users into a cell does not necessarily imply that there will traffic for it to send. Furthermore, the utility does not factor in the amount of data that needs to be sent to the users in question, nor any priorities (QoS) associated with this data. Consider for example, a movement of a large number of users receiving very small traffic payloads, into the CRE region. The above utility will make no distinction between such users and say, others that are receiving large payloads.

Therefore, in this case, the utility will estimate a larger than necessary ABS duty cycle and deprive users attached to the macro cell of service.

Thus it may be desirable to formulate an ABS duty-cycle selection algorithm that factors in and responds to the presence and quantum of data to be transmitted from the network to the users.

Overview of Method and Apparatus for Improving Resource Allocation by Adaptively Setting the ABS Duty Cycle The various network nodes included in a HetNet, for example macro and small cell BSs, include buffers which store data intended for users of the macro and small cell BSs. These buffers can provide information about the total number of bits being held for each user attached to a BS. This information about data, or data about data, is called meta-data. Hence, BSs have access to actual user data and meta-data.

According to at least one example embodiment, the user data and meta data stored in buffers of the BSs of a HetNet can be used to implement an adaptive ABS duty-cycle setting algorithm which improves or optimizes the time taken to deliver the data destined for all users in the system. According to at least one example embodiment, bias values for use in a HetNet implementing the adaptive ABS duty-cycle setting algorithm may be calculated according to any known method.

A method and apparatus for improving resource allocation by adaptively setting the ABS duty cycle will now be discussed in greater detail below with respect to FIGS. 1C and 2.

Figure 1C:
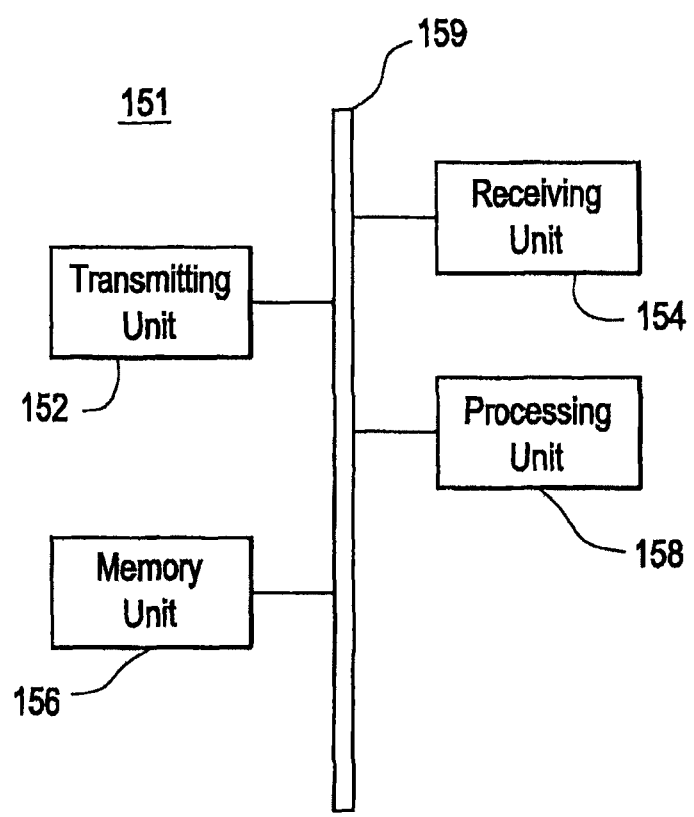
FIG. 1C is a diagram illustrating an example structure of a network element according to at least one example embodiment.

FIG. 1C is a diagram illustrating an example structure of a network element 151. According to at least one example embodiment, either or both of the small cell BS 110B and the macro BS 110A may have the structure and operation of the network element 151 described below. Further, network element 151 may represent a network node other than BS 110B and the macro BS 110A, which is in communication with one or more BSs in the wireless communications network 100. Referring to FIG. 1C, the network element 151 may include, for example, a data bus 159, a transmitting unit 152, a receiving unit 154, a memory unit 156, and a processing unit 158.

The transmitting unit 152, receiving unit 154, memory unit 156, and processing unit 158 may send data to and/or receive data from one another using the data bus 159. The transmitting unit 152 is a device that includes hardware and any necessary software for transmitting wireless signals including, for example, data signals, control signals, and signal strength/quality information via one or more wireless connections to other network elements in the wireless communications network 100. For example, the control signals may include, for example, control signals indicating a BS within the wireless network 100 to set an ABS duty-cycle to a value provided by the network element 151.

The receiving unit 154 is device that includes hardware and any necessary software for receiving wireless signals including, for example, data signals, control signals, and signal strength/quality information via one or more wireless connections to other network elements in communications network 100.

The memory unit 156 may be any device capable of storing data including magnetic storage, flash storage, etc.

The processing unit 158 may be any device capable of processing data including, for example, a microprocessor configured to carry out specific operations based on input data, or capable of executing instructions included in computer readable code.

For example, the processing unit 158 is capable of implementing the operations of an LTE macro cell BS or small cell BS. Further the processing unit 158 is capable of implementing an adaptive ABS duty-cycle setting algorithm for determining an ABS duty-cycle based on information from BSs within the wireless network 100 including, for example, representations of a number of users attached to each of the macro cell 120, the CRE region 127 and the in-cell area 130, and an amount of data buffered at each of the BSs for each of the users attached to the BSs of the wireless network 100. According to at least one example embodiment, any or all network node in the communications network 100 may include the structure and operation of the network element 151.

The adaptive ABS duty-cycle setting algorithm according to example embodiments will now be discussed in greater detail below.

Description of Adaptive ABS Duty-Cycle Setting Algorithm

Using the same notation discussed above with respect to equation (1)-(3), we define, for the $i^{th}$ user, the time $T_i$ that will be taken to deliver the $i^{th}$ user's payload to the $i^{th}$ user, $$T_i = \frac{B_i}{R_i}, \tag{4}$$

where $B_i$ is the amount of data at the eNB that is intended for the $i^{th}$ user, and $R_i$ is the average data transfer rate that the user can support based on his location, radio channel, and radio interference conditions relative to the serving eNB.

One can construct a time-to-deliver based utility metric and attempt to minimize either:

$$U = \prod T_i, \tag{5a}$$

or $$U = \sum T_i, \tag{5b}$$

or $$U = \frac{1}{\sum \frac{1}{T_i}}, \tag{5c}$$

where, these utilities U represented by equations (5a), (5b), and (5c) correspond to the arithmetic, geometric, and harmonic means of the transfer times to the users, respectively. According to at least one example embodiment, a combination of the above utilities may be used as well.

Choice of Utility

To get some insight into the effect of the choice of a particular utility, we take up an illustration from the field of scheduling strategies.

10 units of information reside at a node for two users X and Y. If the units are transferred alternately, in individual units, to the destination receivers, with each transfer taking a unit of time, then user X transfers all its information in 19 units of time while user Y transfers all its information in 20 units of time. On the other hand, if user X transfers all its information prior to user Y starts its information transfer, the transfer time for user X is 10 units of time, while that for Y is 20 units of time.

The total time taken for the two transfers is 39 seconds in the first case and 30 seconds in the second case. The second data transfer strategy therefore minimizes the total time taken to deliver the information in the aggregate and corresponds to the second utility metric above. One downside of this strategy is the delay imposed on user Y's data relative to user X.

Returning to our choice of objective, we select the objective as minimizing the total time to deliver the aggregate data for all the users that resides in the buffers in the network (the macro and small cell eNBs). Such a choice ensures the network is utilized efficiently by aiding in quickly flushing out buffers network-wide. To rectify any imbalances between worst and best case delivery times for individual users, we allow for the use of weighting factors on the user and aggregate eNB-wide delivery-times, as well as fairness-targeting schedulers operating on the pools of users within each eNB.

Closed Form Expression for ABS Duty Cycle θ

The time taken to deliver the bits currently in the buffer to a user i who is in any one of these regions may be represented by $$T_i = \frac{B_{ij}}{(\theta)\frac{R_{ij}}{k_j^{cre}}}, \quad (6a)$$

$$T_i = \frac{B_{ij}}{(1-\theta)\frac{R_{ij}}{k_j^{inc}}}, \quad (6b)$$

and $$T_i = \frac{B_i}{(1-\theta)\frac{R_i}{k^M}} \quad (6c)$$

respectively. Equations (6a), (6b) and (6c), represent times $T_i$ for a user i in the CRE region of a small cell j, a user i in the in-cell region of a small cell j, and a user i in a macro cell M, respectively.

The minimum time utility can therefore be written as the summation of the times taken at each of these scheduling pools as follows, $$U = \sum_{j \in J}\sum_{i \in cre} \frac{B_{ij}}{(\theta)\frac{R_{ij}}{k_j^{cre}}} + \sum_{j \in J}\sum_{i \in inc} \frac{B_{ij}}{(1-\theta)\frac{R_{ij}}{k_j^{inc}}} + \sum_{i \in M} \frac{B_i}{(1-\theta)\frac{R_i}{k^M}}, \quad (7)$$

where J is the set of all small cells j. Thus, equation (7) sums the times $T_i$ for 1) every user i in the CRE region of each small cell j, 2) every user i in the in-cell region of each small cell j, and every user i in the macro cell M. Equation (7) can be simplified and differentiated to yield a closed form expression for the optimal θ which we write in cascaded form for succinct representation. First, equation (7) above is rewritten as $$U = \frac{1}{\theta}\sum_{j \in J}\sum_{i \in cre} \frac{B_{ij}}{\frac{R_{ij}}{k_j^{cre}}} + \frac{1}{1-\theta}\sum_{j \in J}\sum_{i \in inc} \frac{B_{ij}}{\frac{R_{ij}}{k_j^{inc}}} + \frac{1}{1-\theta}\sum_{i \in M} \frac{B_i}{\frac{R_i}{k^M}}, \quad (8)$$

or $$U = \frac{1}{\theta}A^{cre} + \frac{1}{1-\theta}A^{inc} + \frac{1}{1-\theta}A^M, \quad (9)$$

where $A^{cre}$ is $$\sum_{j \in J}\sum_{i \in cre} \frac{B_{ij}}{\left(\frac{R_{ij}}{k_j^{cre}}\right)},$$

$A^{inc}$ is $$\sum_{j \in J}\sum_{i \in inc} \frac{B_{ij}}{\left(\frac{R_{ij}}{k_j^{inc}}\right)},$$

and $A^M$ is $$\sum_{i \in M} \frac{B_i}{\left(\frac{R_i}{k^M}\right)}.$$

The value of θ that minimizes the utility expressed above in equation (9) can be obtained by differentiating it with respect to θ and setting $$\frac{\partial U}{\partial \theta} = 0.$$

Simplification leads to θ as shown below in equation (10), $$\theta^{opt} = \frac{\alpha}{1+\alpha}; \alpha = \sqrt{\frac{A^{cre}}{A^{inc} + Z^M}}. \quad (10)$$

The minimization discussed above with respect to equation (10) can be confirmed by the expression for the second derivative of the utility illustrated in equation (11) below, and the fact that equation (11) is always greater than zero.

$$\ddot{U}|_{\theta=\theta^{opt}} = \frac{2(1+\alpha)^3 A^{cre}}{\alpha^3} + 2(A^M + A^{inc})(1+\alpha)^3 > 0 \quad (11)$$

To gain some intuition about the behavior of the utility described above with respect to equations (8)-(11), in equation (12) below, the value of $\theta^{opt\_fb}$ that minimizes the utility expressed above in equation (9) is specialized for the case where it is assumed that there are equal buffers and equal rates for all users in each of the macro cell M and the CRE region and in-cell regions for all small cells j.

$$\theta^{opt\_fb} = \frac{\sqrt{\sum_j k_j^{cre2}}}{\sqrt{\sum_j k_j^{cre2}} + \sqrt{\sum_j k_j^{inc2} + k^{M2}}} \quad (12)$$

In equation (13) below, the value of $\theta^{opt\_fb\_sc}$ that minimizes the utility expressed above in equation (9) is specialized with respect to a single small cell for the case where it is assumed that there are equal buffers and equal rates for all users.

$$\theta^{opt\_fb\_sc} = \frac{k^{cre}}{k^{cre} + \sqrt{k^{inc2} + k^{M2}}} \quad (13)$$

Equation (13) represents the ABS duty cycle calculated by the adaptive ABS duty-cycle setting algorithm according to at least one example embodiment for the case where there is one small cell and every user has equal rates and buffers. Equation (13) produces an ABS duty cycle that is larger than that discussed above with respect to equation (3). With respect to the ABS duty cycle produced by equation (3), the algorithm represented above by equation (13) may allocate more resources to the small cell users in the CRE region while disadvantaging users connected to the macro cell. However, as the number of macro users becomes a smaller fraction of the total user population, as would be the case when hot spots are located within small cells, or a number of small cells increases, the deleterious impact of such an ABS diminishes and the fairness gain that is one the objectives of small cell deployment may be realized.

Figure 2:
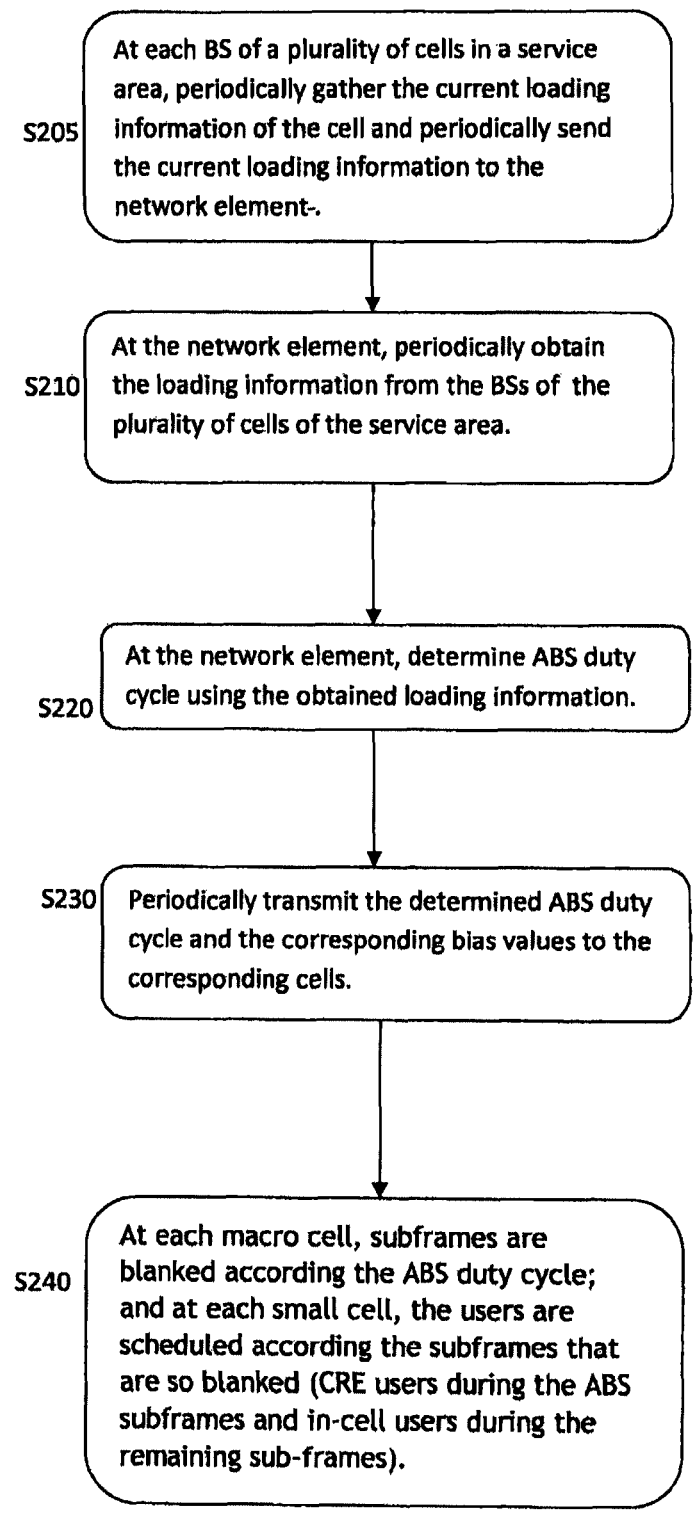
FIG. 2 is a flow diagram illustrating a method of improving resource allocation by adaptively setting the ABS duty cycle.

Example Method for Improving Resource Allocation for Use with Adaptive Streaming FIG. 2 is a flow diagram illustrating a method of improving resource allocation by adaptively setting the ABS duty cycle.

According to at least one example embodiment, each of the operations illustrated in, or described with respect to, FIG. 2 as being performed by a BS may be performed by, for example, one or more BSs, or a non-BS element, having the structure of the network element 151 as illustrated in FIG. 1C. For example, the memory unit 156 may store executable instructions corresponding to each of the operations described below with reference to FIG. 2. Further, the processor unit 158 may be configured to perform each of the operations described below with respect to FIG. 2. Further, according to at least one example embodiment, transmitted data and/or control signals may be transmitted through the transmitting unit 152, and received data and/or control signals may be received through the receiving unit 154.

The method illustrated in FIG. 2 will be discussed below with reference to wireless network 100 illustrated in FIG. 1 with an example in which the network element 151 is implemented by the macro BS 110A illustrated in FIG. 1A. However, according to at least one example embodiment, the network element 151 may be implemented by any node within the wireless network 100 including, for example, a macro BS a small cell BS, or a non-BS node in communication with one or more BSs within the wireless network 100.

Referring to FIG. 2, in step S205, the BSs corresponding to each of a plurality of cells in a service area each periodically gather current loading information and send the loading information to the network element 151.

As used herein, a service area may include, for example, the area covered by a macro cell and each small cell underlaid with respect to the macro cell.

As one example, in the case where the network element 151 is implemented by the macro BS 110A, the macro BS 110A may periodically gather loading information for the macro cell 120, and BSs for each of the small cells in the wireless network 100 underlaid with respect to the macro cell 120 may periodically gather loading information corresponding to the small cells and send the loading information to the macro cell 110A.

Alternatively, in the case where the network element 151 is implemented by a node other than the macro BS 110A, the macro BS 110A and each of the BSs for small cells underlaid with respect to the macro cell 120 may periodically send gathered loading information to the network element 151.

The nature loading information gathered by the cells will be discussed in greater detail below.

With respect to the macro cell 120, the loading characteristic information may include information indicating a data receive rate and buffer size for each active user in the macro cell 120 as well as a total number of active users attached to the macro cell 120. Active users are, for example, users with non-empty data buffers. Buffer size as used herein refers to an amount of data stored in a data buffer for a corresponding user. With respect to the small cell 125, the loading characteristic information may include information for both the CRE region 127 and the in-cell region 130 which is sent from the small cell BS 110B to the macro BS 110A. For example, with respect to the CRE region 127, the loading characteristic information may include data indicating a data receive rate and buffer size for each active user in CRE region 127 as well as a total number of active users in the CRE region 127; and with respect to the in-cell region 130, the loading characteristic information may include data indicating a data receive rate and buffer size for each active user in in-cell region 130 as well as a total number of users in the in-cell region 130.

For example, based on equation (8)-(10) discussed above, the macro BS 110A may gather rate and buffer size for each user in the macro cell 120, as well as a total number of users attached based on monitoring information stored at the macro BS 110A according to known methods. The macro BS 110A may then obtain, as the loading characteristic value for the macro cell 120, the value represented by equation (14) below, $$L^M = \sum_{i \in M} \frac{B_i}{\left(\frac{R_i}{k^M}\right)} \quad (14)$$

where $L^M$ is a loading characteristic value for the macro cell M. The macro cell M, in the present example, is the macro cell 120.

Additionally, the small cell BS 110B may gather a data rate and buffer size for each user in the CRE region 127 and the in-cell region 130 as well as a total number of users attached to the CRE region 127 and the in-cell region 130 based on monitoring information stored at the small cell BS 110B according to known methods.

The small BS 110B may then determine, as loading characteristic values for the CRE region 127 and the in-cell region 130, the values represented by the following equations (15) and (16) respectively:

$$L_j^{cre} = \sum_{i \in cre} \frac{B_{ij}}{\left(\frac{R_{ij}}{k_j^{cre}}\right)} \quad (15)$$

$$L_j^{inc} = \sum_{i \in inc} \frac{B_{ij}}{\left(\frac{R_{ij}}{k_j^{inc}}\right)}, \quad (16)$$

where $L_j^{cre}$ and $L_j^{inc}$ are loading characteristic values for the CRE region and in-cell region of the small cell j, and j, in the present example, is the small cell 125. The small cell BS 110B may then send the values $L_j^{cre}$ and $L_j^{inc}$ to the macro cell BS 110A via, for example, a message sent from the small cell BS 110B to the macro cell BS 110A. The message carrying the loading characteristic may be sent via a known interface including, for example the X2 interface.

Step 205 is explained above with respect to an example where the loading information sent to the network element 151 in step S205 may be the loading characteristic values obtained from the cells in the wireless network 100 in the form of the values $L^M$, $L_j^{cre}$, and $L_j^{inc}$ described above with respect to equations (14)-(16). Alternatively, the loading information gathered and sent to the network element 151 in step S205 may be information regarding, for the macro cell and each of the CRE region and in-cell regions of each of the small cells, a data rate for each user of the cell, a buffer size for each user of the cell, and a total number of users attached to the cell.

In step S210, the network element 151 periodically obtains loading information from BSs of each of the plurality of cells of the service area.

For example, the macro BS 110A may periodically receive loading characteristic values $L_j^{cre}$ and $L_j^{inc}$ for each small cell j underlaid with respect to the macro cell 120 in the wireless network 100 including, for example, the small cell 125. The macro cell 110A may receive the loading characteristic values via a known interface including, for example, the X2 interface.

Further, in the case where the network element is implemented by a node other than the macro BS 110A, the network element 151 may periodically receive the loading characteristic value $L^M$ from the macro BS 110A, in addition to the receiving the loading characteristic values $L_j^{cre}$ and $L_j^{inc}$.

Step 210 is explained above with respect to an example where the loading information obtained by the network element 151 in step S205 may be the loading characteristic values obtained from the cells in the wireless network 100 in the form of the values $L^M$, $L_j^{cre}$, and $L_j^{inc}$ described above with respect to equations (14)-(16). Alternatively, the information obtained by the network element 151 in step S210 may be information regarding, for the macro cell and each of the CRE region and in-cell regions of each of the small cells, a data rate for each user of the cell, a buffer size for each user of the cell, and a total number of users attached to the cell, which the network element 151 can use this information to, for example, calculate all or any one of the values $L^M$, $L_j^{cre}$, and $L_j^{inc}$ at the network element 151.

In step S220, the network element 151 determines an ABS duty cycle based on the loading characteristic information obtained in step S210.

For example, the macro BS 110A can use the loading characteristic information obtained in step S210 for the macro cell 120, the CRE region 127 of the small cell 125, and the in-cell region 130 of the small cell 125 to calculate an ABS duty cycle θ for use by the macro cell 120 and all small cells underlaid with respect to the macro cell 120 including, for example, the small cell 125. According to at least one example embodiment, the macro cell 110A may calculate the ABS duty cycle θ using equation (10) discussed above.

Equation (10) requires the values $A^M$, $A^{inc}$, and $A^{cre}$, each of which the macro BS 110A can calculate based on the information obtained in step S210.

For example, the value $A^M$ can be determined based on the value $L^M$ obtained with respect to the macro cell 120. The value $A^{cre}$ can be determined by summing the values $L_j^{cre}$ obtained or calculated with respect to each small cell j underlaid with respect to the macro cell 120, including, for example, the small cell 125. The value $A^{inc}$ can be determined by summing the values $L_j^{inc}$ obtained or calculated for each small cell j underlaid with respect to the macro cell 120, including, for example, the small cell 125.

In step S230, the network element 151 communicates the determined ABS duty cycle to cells in the wireless network 100. According to at least one example embodiment, after calculating the ABS duty cycle θ in step S220, the macro cell 110A sends the ABS duty cycle θ to each small cell underlaid with respect to the macro cell 120, including the small cell 125, via, for example, messages sent from the macro BS 110A to BSs associated with each of the small cells underlaid with respect to the macro cell 120 including, for example, the small cell BS 110B.

According to at least one example embodiment, in the case where the network element 151 is implemented by a non-BS element, the network element 151 may, for example, send the calculated ABS value θ to the macro cell 120. Further, the network element 151 may additionally send the calculated ABS value θ to all small cells underlaid with respect to the macro cell 120, including the small cell 125.

In step S240, at each macro cell, subframes are blanked according the ABS duty cycle; and at each small cell, the users are scheduled according the subframes that are so blanked (CRE users during the ABS subframes and in-cell users during the remaining sub-frames).

For example, the macro BS 110A and the BSs of every small cell underlaid with respect to the macro cell 120 may use the ABS duty cycle determined by the macro BS 110A in step S220, until the macro BS 110A determines a new ABS duty cycle, and sends the new ABS duty cycle to each BS. The macro BS 110A may blank subframes in accordance with the determined ABS duty ratio, and the small cell BSs underlaid with respect to the macro BS 110A may schedule CRE users during the ABS subframes, and schedule in-cell users during the remaining subframes.

Steps S205-S240 may be performed continuously so the ABS values used for the macro cell 120 and all cells underlaid with respect to the macro cell 120 is updated in real time corresponding to the present buffer sizes and data receive rates being experienced by each of the users in each of the macro cell 120, CRE region 127 and in-cell region 130.

Though the method illustrated in FIG. 2 is described with respect to an example where there is one macro cell 120 having one or more underlaid small cells, the method illustrated in FIG. 2 may also be applied to a cluster of multiple macro cells each having one or more underlaid small cells. If the ABS selection process discussed above with reference to FIG. 2 and equation (10) is performed over a cluster of macro cells and the small cells embedded within the macro cells, according to at least one example embodiment, a single ABS duty cycle and pattern may be used across the entire cluster of macros. And each of the small cells will schedule their in-cell and CRE users accordingly.

Determining the ABS Duty Cycle at Plural BSs

FIG. 2 is described above with respect to an example in which the network element 151 may be implemented by, for example, a central network node including, for example a BS or non-BS element. However, according to at least one example embodiment, plural or all BSs in the wireless network 100 may each implement the network element 151.

For example, referring again to FIG. 2, in step S205 every BS including the macro BS 110A and the BSs of every small cell underlaid with respect to the macro cell 120, may gather loading information and send the loading information to every other BS.

Accordingly, in step S210, the macro BS 110A receives loading information for every small cell underlaid with respect to the macro cell 120. Further, each small cell BS corresponding to a small cell underlaid with respect to the macro cell 120 receives loading information corresponding to every other small cell, and the macro cell 120.

This way, in step S220, each of the macro BS 110A and the BSs of every small cell underlaid with respect to the macro cell 120 now has the information necessary to individually use equation (10) to determine the ABS duty cycle θ. Accordingly, the ABS duty cycle θ transmitting step S230 is no longer necessary, and each BS can proceed directly from step S220 to step S240 where the ABS duty cycle determined in step S220 is used by each BS until a new ABS value is determined.

As an example, each BS may periodically determine an output for equation (10) based on presently received loading information, and use the determined output as the ABS duty cycle. Every BS may schedule ABS duty cycle value updates at the same time in order to help ensure uniformity among the ABS duty cycles calculated at different BSs by promoting the use of the same sets of loading information across all the BSs in a service area for calculating the ABS duty cycles.

Using the adaptive ABS setting algorithm discussed above with reference to FIG. 2, the determined ABS values take into account, not only the number of users attached to various regions in a HetNet, but also buffer sizes and data receive rates associated with each of the users thus promoting fair allocation of network resources even when traffic is bursty and/or when some attached users have little or no data to send.

Example embodiments being thus described, it will be obvious that embodiments may be varied in many ways. Such variations are not to be regarded as a departure from example embodiments, and all such modifications are intended to be included within the scope of example embodiments.

What is claimed:

1. A method of setting an almost blank subframe (ABS) duty cycle in a heterogeneous network including a macro cell and one or more small cells, the one or more small cells being underlaid with respect to the macro cell, the method comprising:
    obtaining, at a network element, loading information corresponding to each of the macro cell and the one or more small cells, the loading information including, for each of the macro cell and the one or more small cells, an indication of an amount of information buffered at the cell for each user attached to the cell; and
    determining the ABS duty cycle based on the obtained loading information,
    wherein for each of the one or more small cells, users attached to the small cell are designated as being associated with one of an inner region of the small cell or an outer region of the small cell, and for each of the one or more small cells, the corresponding loading information includes inner loading information and outer loading information, the inner loading information including an indication of an amount of information buffered for each user designated as being associated with the inner region of the small cell, the outer loading information including an indication of an amount of information buffered for each user designated as being associated with the outer region of the small cell.

2. The method of claim 1, further comprising:
    sending the determined ABS duty cycle from the network element towards base stations (BS)s of one or more cells from among the macro cell and the one or more small cells.

3. The method of claim 2, wherein the network element is a BS of a cell from among the macro cell and the one or more small cells.

4. The method of claim 1, wherein the determined ABS duty cycle is defined by the following expressions $$\theta^{opt} = \frac{\alpha}{1+\alpha}; \alpha = \sqrt{\frac{A^{cre}}{A^{inc} + A^M}},$$

where $\theta^{opt}$ is the determined ABS duty cycle, the value $A^M$ is a representation of the obtained loading information corresponding to the macro cell, the value $A^{inc}$ is a representation of the obtained loading information corresponding to the inner regions of the one or more small cells, and the value $A^{cre}$ is a representation of the loading information corresponding to the outer regions of the one or more small cells.

5. A network apparatus for setting an almost blank subframe (ABS) duty cycle in a heterogeneous network including a macro cell and one or more small cells, the one or more small cells being underlaid with respect to the macro cell, the apparatus comprising:
    a receiving unit configured to receive data;
    a transmitting unit configured to transmit data;
    a memory unit; and
    a processing unit coupled to the transmitting unit, the receiving unit, and the memory unit and configured to control operations associated with determining the ABS duty cycle, the operations including,
        obtaining, at a network element, loading information corresponding to each of the macro cell and the one or more small cells, the loading information including, for each of the macro cell and the one or more small cells, an indication of an amount of information buffered at the cell for each user attached to the cell; and
        determining the ABS duty cycle based on the obtained loading information,
    wherein for each of the one or more small cells, users attached to the small cell are designated as being associated with one of an inner region of the small cell or an outer region of the small cell, and for each of the one or more small cells, the corresponding loading information includes inner loading information and outer loading information, the inner loading information including an indication of an amount of information buffered for each user designated as being associated with the inner region of the small cell, the outer loading information including an indication of an amount of information buffered for each user designated as being associated with the outer region of the small cell.

6. The apparatus of claim 5, wherein the processing unit is further configured to:
    send the determined ABS duty cycle from the network element towards one or more base stations (BS)s of cells from among the macro cell and the one or more small cells.

7. The apparatus of claim 6, wherein the network element is a BS of a cell from among the macro cell and the one or more small cells.

8. The apparatus of claim 1, wherein the processing unit is configured such that the determined ABS duty cycle is defined by the following expressions $$\theta^{opt} = \frac{\alpha}{1+\alpha}; \alpha = \sqrt{\frac{A^{cre}}{A^{inc} + A^M}},$$

where $\theta^{opt}$ is the determined ABS duty cycle, the value $A^M$ is a representation of the obtained loading information corresponding to the macro cell, the value $A^{inc}$ is a representation of the obtained loading information corresponding to the inner regions of the one or more small cells, and the value $A^{cre}$ is a representation of the loading information corresponding to the outer regions of the one or more small cells.

* * * * *